United States Patent
Mertelsmann et al.

(10) Patent No.: US 12,435,306 B2
(45) Date of Patent: Oct. 7, 2025

(54) METHOD FOR SETTING UP AN APPARATUS FOR BIOLOGICAL PROCESSES AND APPARATUS FOR BIOLOGICAL PROCESSES

(71) Applicant: BioThera Institut GmbH, Freiburg (DE)

(72) Inventors: Roland Mertelsmann, Freiburg (DE); Justus Duyster, Freiburg (DE); Marie Follo, Heitersheim (DE); Sascha Lange, Gundelfingen (DE); Maximiliano S. Perez, Buenos Aires (AR)

(73) Assignee: BIOTHERA INSTITUT GMBH, Freiburg (DE)

(*) Notice: Subject to any disclaimer, the term of this patent is extended or adjusted under 35 U.S.C. 154(b) by 1299 days.

(21) Appl. No.: 17/260,369

(22) PCT Filed: Jul. 16, 2019

(86) PCT No.: PCT/EP2019/069115
§ 371 (c)(1),
(2) Date: Jan. 14, 2021

(87) PCT Pub. No.: WO2020/016223
PCT Pub. Date: Jan. 23, 2020

(65) Prior Publication Data
US 2021/0269762 A1    Sep. 2, 2021

(30) Foreign Application Priority Data

Jul. 18, 2018 (DE) .................... 10 2018 117 395.4

(51) Int. Cl.
| | |
|---|---|
| C12M 1/36 | (2006.01) |
| C12M 3/06 | (2006.01) |
| C12Q 3/00 | (2006.01) |
| G06F 7/58 | (2006.01) |
| G06N 5/04 | (2023.01) |
| G06N 20/00 | (2019.01) |

(52) U.S. Cl.
CPC ............ *C12M 41/48* (2013.01); *C12M 23/16* (2013.01); *C12Q 3/00* (2013.01); *G06F 7/58* (2013.01); *G06N 5/04* (2013.01); *G06N 20/00* (2019.01)

(58) Field of Classification Search
CPC ....... C12M 41/48; C12M 23/16; G06N 20/00; G06N 5/04; C12Q 3/00; G06F 7/58
See application file for complete search history.

(56) References Cited

U.S. PATENT DOCUMENTS 7,276,720 B2 * 10/2007 Ulmer ............... B01L 3/502715
250/435
2017/0357748 A1   12/2017 Thouppaurachchi et al.

FOREIGN PATENT DOCUMENTS

| JP | 2009044974 | 3/2009 |
|---|---|---|
| WO | 2017132674 | 8/2017 |

OTHER PUBLICATIONS

Levine, B.L., "Global Manufacturing of CAR T Cell Therapy". Mol. Ther. Methods Clin. Dev. 4:92-101, (2016).
Yin, Z., "Data-driven Prediction of Stem Cell Expansion Cultures." Annual International Conference of the IEEE Engineering in Medicine and Biology Society, 3577-80 (2011).

* cited by examiner

*Primary Examiner* — Jerry Lin
(74) *Attorney, Agent, or Firm* — Volpe Koenig

(57) ABSTRACT

A method for setting up an apparatus (1) for biological processes (3), in which process parameters are specified for a plurality of biological processes (3) with computer assistance, that for each biological process (3) a process state is automatically captured, that the particular process state is evaluated using a specified objective with computer assistance, and that from the evaluations the apparatus (1) is set up, with computer assistance, through specification of learned set-up parameters. In addition, an apparatus (1) for biological processes (3) is provided with which the proposed method can be carried out in a particularly advantageous manner.

12 Claims, 2 Drawing Sheets

METHOD FOR SETTING UP AN APPARATUS FOR BIOLOGICAL PROCESSES AND APPARATUS FOR BIOLOGICAL PROCESSES

TECHNICAL FIELD

The invention relates to an apparatus for biological processes and also to a method for setting up such an apparatus. These kinds of methods and apparatuses are known from practical experience.

BACKGROUND

For example, the practice of getting a cell culture to grow in a Petri dish is known. To this end, a nutrient solution and one or more growth factors may be added to the cell culture. It may be difficult to find an optimum dosage of the growth factor, or to get the cells to grow at all. If for example too low a dose of the growth factor is administered, then fast growth cannot occur. But also, if the growth factor dose is too high, the growth of the cells may slow down or even stop.

In practice, therefore, experiments are carried out in repeat succession in order to obtain an optimum dosage. These experiments are very time-consuming and/or costly. Cell cultures are repeatedly prepared anew by one person, monitored and analyzed until a desired result is obtained. The specific experimental approach here is dependent on the skill and strategy of the person carrying out the experiment in the particular case. This is problematic, because this approach is not very efficient.

SUMMARY

Against this backdrop, the task underlying the invention is to create a method for setting up an apparatus for biological processes which enables efficient set-up of such an apparatus. In addition, an apparatus for biological processes ought to be created by means of which analyses of biological processes are simplified.

Insofar as variations of the invention are described below, these can be combined with one another as desired provided a combination is not ruled out for technical reasons.

In order to solve the aforementioned task, the invention provides an apparatus and a method having one or more of the features described herein. Thus in particular, in accordance with the invention and in order to solve the named task in the case of a method of the type described at the start, it is proposed that process parameters are specified for each of a plurality of biological processes in a computer-assisted manner, that for each biological process a process state is automatically captured, that the particular process state is evaluated on the basis of a specified objective with computer assistance, and that from these evaluations, the apparatus is set up with computer assistance through specification of learned set-up parameters.

Once the apparatus is set up, the apparatus is capable of controlling a biological process using the learned set-up parameters. The set-up parameters obtained may for example be learned process parameters or assignments between process states and learned process parameters.

One application of the invention may for example be in the field of cancer treatment. For example, it may be provided that T cells are taken from a patient and a new gene is inserted into these (CAR T cells). The thus modified cells may then serve as a cell culture and be introduced into a vessel of the apparatus in order to allow them to grow there. The proliferated cells may then be returned to the patient in order to fight the cancer that the patient is suffering from. With the inventive method it becomes possible to learn set-up parameters of the apparatus which result in optimum cell growth of the modified CAR T cells. It therefore becomes possible to discover optimum growth conditions and growth parameters for the modified CAR T cells in an efficient manner.

A further application of the invention in the field of cancer treatment may for example make provision, by means of the inventive method and an apparatus according to the invention, for an optimum dosage and dose kinetics of a chemotherapeutic drug to be discovered. For example, provision may be made to add a nutrient solution via a first pump, and a chemotherapeutic medication such as Adriamycin via a second pump, to a culture of cancer cells. With the inventive method it can now be made possible to learn set-up parameters of the apparatus which lead to elimination of the living cancer cells in the cell culture using what, for the person, is the most tolerable dosage of the drug as possible.

Further applications may also be in fields other than cancer treatment and cover all areas of medicine or biology.

The capturing of a process state for a biological process comprises it also being possible to capture more than one process state of the biological process, for example it may be provided that a process state—at that particular time—of the biological process is captured at regular time intervals.

The specification of the objective may be based on a result to be obtained. If, for example, cell growth is to be maximized in a particular time, then the objective may state that the cell density or the number of living cells should be at its maximum once a particular time horizon has elapsed.

In order to achieve a dose optimization, then in an alternative experiment the objective may state completely eliminating a cancer cell by adding as small a quantity of a certain drug as possible.

The objective may form an evaluation criterion for evaluating the particular process state, or it may be provided that such an evaluation criterion is derived from the objective. The evaluation criterion may for example be a reward, cost or penalty function. For example, an evaluation criterion may be derived from the named objective which (criterion) provides that the cell density of the living cancer cells and the quantity of drug applied within a certain time frame are evaluated. The process state may therefore, in this alternative experiment, comprise—alongside the cell density of the living cells—a measured temperature and a cumulatively applied quantity of drug, wherein the applied quantity of drug may be measured separately or be estimated from the specification of the process parameters.

The objective may for example specify a weighted reward function. In particular, it may be provided that the objective evaluates a state in the categories as better or worse. It may be provided that a reward function is specified which may attain real values in an interval, for example between 0 and 1, wherein a first real number which is closer to 1 than a second real number is evaluated as better than the second real number. It may also be provided that the objective envisages a reward function which only has two states, for example 1 and 0, or infinite and 0, or the like. In particular, it may be provided that the objective evaluates a state in the categories good or bad. It may be provided that a reward function should be maximized. As an equivalent to this, it may be provided that the reward function is a cost function which should be minimized. For example, here a 0 may cause no costs and a 1 high costs. A cost function may for example represent a number of time steps. This may for example be useful if an aim is to find a time-optimized solution, for example because a certain cell density ought to be achieved in as short a time as possible.

Capturing a process state preferably occurs through a selection of parameters of the process state being captured. For example, a cell density of living or dead cells of a certain cell type, a number of cells or a surface covered by the cells may be captured. This may for example occur by the biological process being observed using an imaging camera and by identifying, using a suitable computer-implemented method, for example on the basis of contours of the cells or cell populations, whether the cell is living and how many living cells are present in total, or what cell density these cells have. The process state may comprise any desired property of the biological process, which may also include external process parameters affecting the biological process, for example also the specified or set process parameters.

The process parameter may be any desired acting parameter by means of which influence can be exerted on a, or the, biological process. These include for example environmental conditions such as a temperature, a pressure or a humidity value. A process parameter may also be given by a volume flow of a substance which is fed into the biological process. The substance may for example be of the nature described further down.

The specification of process parameters may also comprise adjustment means—by means of which the biological process parameters are adjustable—being adjusted. If for example a volume flow of a substance to be fed should be adjusted, then it may be provided that for example a pump or a valve is operated in a suitable manner.

The specification of process parameters may also comprise specifying a temporal progression of the process parameters.

The proposed inventive solution therefore permits the use of efficient and clearly defined set-up strategies.

It may be provided that the set-up parameters are specified by a learning method which learns from evaluations of captured process states. Preferably the learning method is a machine learning method. Particularly advantageous methods shall be named at a suitable point further down in this invention description. Other learning methods may also be used, in particular those which are compatible with the technical features which are described more precisely in the following.

With a particularly advantageous design of the invention, it may be provided that the specification of the process parameters is based on a random decision. The technical teaching according to this embodiment of the invention is diametrically different from a conventional experimental approach. The methods used by a person with experience for corresponding biological processes are not based on random decisions. The use of chance seems at first glance to contradict the aim of finding set-up parameters for the apparatus in an efficient manner. However, it becomes apparent that the implementation of a chance event may lead to more rapid and better results than is the case with alternative methods. In particular, it becomes possible by this means—also with a plurality of process parameters, measurement states and biological processes—to efficiently set up the apparatus with high quality.

Preferably the random decision is made or at least influenced by a random number generator through the generation of a random number. The random number generator may also be a pseudo-random number generator. Even if such a pseudo-random number generator is, mathematically speaking, a deterministic random number generator, the latter generates, if set up accordingly, random numbers that from a practical perspective are independent of one another, meaning that within the scope of the present invention, such a pseudo-random generator can be regarded as non-deterministic.

Alternatively, it may also be provided that the specification of the process parameters is based on a purely deterministic decision. Such a method also differs significantly from conventional methods in which a pending decision is the result of an adaptive evaluation linked to experience-based knowledge. Thus, in order to specify the process parameters, it is possible, for example, for the range spanned by the process parameters to be discretized by a grid which is sampled systematically between specified grid boundaries. Here it is possible, for example, to use grid-search methods. These kinds of methods are particularly suitable for problems with a small number of variables or for a first rough set-up of the apparatus.

It may also be provided that a purely deterministic approach is combined with an approach based on a random decision. For example, using a very rough grid the specification of the process parameters may, in a first step, occur in a purely deterministic manner. Not until a second step may it be provided that the specification of the process parameters is then based on a random decision.

It may be provided that, in order to specify the process parameters, a random number, for example the random number already named above, is generated which has a probability distribution of a certain random variable. The random variable may for example have a normal distribution.

A method may be particularly efficient if it provides that a most probable value for the process parameters is calculated purely deterministically from process states already captured and their evaluations. Preferably it is provided that the most probable value for the process parameters maximizes the expected evaluation and/or the expected information gain of a subsequent process step. For example, methods of Bayesian optimization may be used in order to maximize a weighting between an expected evaluation and an expected information gain.

In order to specify the process parameters, it may be provided that after determination of the most probable value for the process parameters, a value is selected close to this most probable value, wherein, for this, a random number is generated which preferably is normally distributed around the most probable value.

For example, it is possible to use evolutionary algorithms or evolutionary strategies or a hill climbing algorithm.

It may be provided that the specification of process parameters in a first environment of a parameter range is more probable than the specification of process parameters in a second environment of the parameter range, if in the first environment an evaluation that had already taken place was better than an evaluation that had already taken place in the second environment. The implementation of a positive expectation of success of this type may result in a particularly efficient set-up of the apparatus.

It may be provided that, starting with a first estimation of suitable process parameters in an environment of this estimation, a process parameter is selected at random. Preferably the random selection occurs using a random variable. Alternatively, it may be provided that, starting with the aforementioned first estimation, a direction for improvement is specified using gradient-based methods. Preferably a random number is used to estimate the direction for improvement. This random number may in particular be used to obtain an estimation of a Jacobian matrix and/or a Hessian matrix. The Jacobian matrix and/or the Hessian matrix are preferably estimated from evaluations that have already taken place, process states that have already been captured and/or process parameters that have already been specified. For example, the Jacobian matrix and/or the Hessian matrix may be estimated from data already determined, for example from the outcomes of the experiments previously performed, the process states recorded over the course of these in discrete time intervals, process parameters and/or values of a reward function. These kinds of methods may lead to very rapid learning progress.

It may also be provided that a random number is generated and used in order to model an uncertainty of a first estimation for a specification of process parameters and thereby arrive at a better estimation.

The use of a policy gradient method may be advantageous.

In order to increase the efficiency of the method according to the invention it may also be provided that, for initialization of the method, results from preliminary analyses are used. Preferably the preliminary analyses comprise an experiment and/or a computer simulation of a biological process. Preferably the computer simulation models one, several, or all biological processes of the plurality of biological processes. Particularly preferably, the computer simulation models the apparatus in operation. This kind of initialization of the method can lead to improved set-up of the apparatus and/or to a faster set-up of the apparatus because, for example, fewer process states have to be captured and evaluated.

With a further advantageous embodiment of the invention, it may be provided that biological processes of the plurality of biological processes run in parallel. This may be advantageous because, by this means, the set-up of the apparatus may occur in a shorter time period. A further advantage consists of it being possible, by this means, to achieve an improved set-up, because by this means systematic errors can be avoided. These kinds of systematic errors may for example arise if a new cell culture has to be prepared in order to capture additional process states. The errors may be smaller if a plurality of samples is taken from a prepared cell culture which (samples) are then captured in parallel. In order to achieve a situation where the biological processes run in parallel, it may be advantageous to use a microfluidic device with several chambers described more precisely further down.

Alternatively, or in addition, it may be provided that biological processes of the plurality of biological processes run in series. Biological processes running in series may in particular be advantageous if it is not possible to capture sufficient data using a parallel design and/or if the biological processes are not reversible and/or if, following the end of a biological process, further learning steps are required for setting up the apparatus.

With a further advantageous embodiment of the invention, it may be provided that for at least two biological processes running in parallel, different process parameters are specified. By this means an information gain and/or better evaluations can be achieved in a shorter time, meaning that the set-up of the apparatus becomes more efficient. Alternatively or additionally, it may be provided that for at least two biological processes running in parallel, identical process parameters are specified. This may for example be advantageous for the purpose of reducing statistical variations.

It may additionally be provided that a process state of a biological process is reset or that at least one parameter of a process state of a biological process is reset. Preferably a biological sample is replaced by a biological sample with the same initial state or an initial state which is as similar as possible. Two initial states are largely the same if they are a result of variations that occur during the preparation of the same biological samples. For example, it may be provided that a microfluidic device with cells that are not yet influenced is prepared anew. In the case of reversible biological processes, or at least in the case of a reversibility of one parameter of a process state of the biological process, a resetting may also take place without replacing a biological sample, for example by the process parameters being selected such that the process state or the parameter of the process state is once again reached. A resetting of biological processes may be advantageous because, by this means, a high information gain may be achieved.

It may also be provided that at least two of the plurality of biological processes or indeed all biological processes are set up in such a way that, if they are influenced in the same way, they—as far as possible—run the same. This may for example be achieved by the biological samples in which the biological processes run being prepared in the same way. By this means, a high information gain can be achieved in a shorter time.

In addition, it may be provided that during the course of a biological process, its process state is captured and/or evaluated several times. Preferably this takes place continuously. Preferably the continuous capturing and evaluation is implemented technically by capturing and/or evaluation taking place in constant, or as constant as possible, discrete time periods. The duration of the time periods may be adapted here to the dynamics of the biological process and the required computing power. For example, the process state may be captured every 5 minutes. These kinds of processes may result in a particularly efficient set-up of the apparatus as it thereby becomes possible to respond to changes in a process state directly, without having to wait until a time horizon of the biological process is reached or until this has elapsed. By this means, a set-up in real time is enabled. Alternatively or additionally, it may be provided that during the course of a biological process, the process parameters are specified multiple times, preferably continuously. Preferably the process parameters are adjusted multiple times, in particular continuously. In addition, in this respect, technical implementation may take place through discretization of the time.

This enables the optimization of a strategy with which, during the course of a biological process, multiple decisions are made. A decision may for example consist of updating process parameters at a decision timepoint. In particular, a learning method may be used in which a function is learned from the captured process states which evaluates the possible actions for each process state with regard to an expected future reward. Such a function may also be designed as a value function or q-function. If such a function is known, then it may be used to select the action evaluated best in each process state. Learning methods which may be considered are, for example, a method of optimizing learning (reinforcement learning), a method of batch reinforcement learning, of q-learning and/or a method which models a Markovian or multi-level decision-making process.

With a further advantageous embodiment of the invention, it may be provided that a parameter space of the process parameters is reduced by specifying basic strategies for temporal evolutions of the process parameters and by mixing the basic strategies with each other. Preferably at least one basic strategy is constituted by a sinusoidal temporal progression of a process parameter. By way of a parameter of the sinusoidal temporal progression, the amplitude, the frequency or a time shift may for example be freely selectable in order to define the sinusoidal temporal progression of the process parameter. In this way, improvement of the set-up of the apparatus may be improved. For example, the basic strategies may be designed so as to model a-priori knowledge. A further advantage of the use of these kinds of basic strategies is that the computing times may be reduced in order to enable real-time applications or to be able to carry out a calculation with higher precision. If it is for example suspected, on the basis of prior knowledge, that a periodic temporal progression of a process parameter could lead to good results, then it makes sense to provide this as a possible basic strategy for this process parameter. For example, it has been shown that periodic application of a growth factor may be an advantage in the case of certain cell cultures.

In order to solve the named task, a method for the control of an apparatus may be provided, wherein the apparatus accepts a plurality of biological samples and is controlled by a process parameter being set,
  wherein an experiment is performed which comprises a repeated application of a partial experiment, wherein the partial experiment comprises at least the following steps:
    Adjustment of a current process parameter according to an update previously carried out with computer assistance,
    Automatic capturing of a current state parameter for each biological sample and processing and/or storage of the captured current state parameters,
    Generation of an evaluation result through computer-assisted evaluation of a result of a partial experiment using an objective and a current experimental parameter, wherein the current experimental parameter comprises a current state parameter and/or a current process parameter, as well as processing and/or storage of the evaluation result
    Updating of the process parameter through computer-assisted derivation from previously processed and/or stored experimental parameters and evaluation results and processing and/or storage of the updated process parameter.

The previously described control method may also be combined with the previously described variations of the set-up method. In addition, individual technical features or any desired combination of the features of the control method may form technical features of the previously described set-up method and vice versa.

The partial experiment may comprise a resetting of a process state of a biological process or at least of a parameter of a process state of a biological process, in particular as already previously described. Thus, the partial experiment may for example provide for the replacement of the biological samples with other biological samples for which an intended biological process has not yet been completed.

Alternatively, it may be provided that the partial experiment only models a discrete time period within the context of a continuous capturing and or evaluation of a process state of a biological process while it is running, in particularly as previously described. Here it may be provided that after several time steps and/or attainment of a time horizon, the—in each case-subsequent partial experiment additionally comprises a resetting of the process state or at least of a parameter of the process state.

In order to solve the named task, in accordance with the invention one or more of the features geared towards an apparatus for biological processes are provided. In particular it is hence proposed in accordance with the invention, in order to solve the named task, that an apparatus for biological processes have a vessel for receiving a biological sample. The vessel may for example be a reactor, a Petri dish, a cell culture bag or a microfluidic device. Preferably it is provided that the microfluidic device has a plurality of serial or parallel chambers. The biological sample is so designed that with it a plurality of biological processes may be carried out. The biological sample may in particular consist of a plurality of partial samples.

For example, a microfluidic device having several chambers may be prepared in such a way that the chambers each surround a partial biological sample. The biological sample may for example comprise a cell culture and/or an enzyme sample.

Preferably the vessel has a supply line for supplying a substance. This means that the vessel may also have more than one supply line for supplying substances. The substance may for example be a nutrient broth, a medium, a growth factor or a drug.

In accordance with the invention, the apparatus has adjustment means with which, for the biological processes, process parameters are adjustable. Preferably, the adjustment means comprise a means for adjusting a volume flow of a substance, for example one of the aforementioned substances. This may for example take place by means of a pump or a controllable valve. Also, several means for adjusting different volume flows for different substances may be provided. In addition, it may be provided that adjustment means for adjusting an environmental condition such as a temperature, a pressure or a humidity, are constructed. Thus, the process parameters may for example be a volume flow of a substance or an environmental condition.

In accordance with the invention, the apparatus also has capturing means, by means of which a process state is automatically capturable for each biological process. The capturing means may for example be an imaging camera and/or a sensor. It may be provided that the measurement data captured with the imaging camera and/or with the sensor are filtered according to relevant information. This may for example take place in a computation unit, described next, in which preferably the filtered information is stored in a memory.

In accordance with the invention, the apparatus additionally has a computation unit which is connected via a data line to the capturing means and via a further data line to the adjustment means. With the computation unit, therefore, data captured by the capturing means can be received. In addition, control signals can be sent from the computation unit to the adjustment means. It may also be provided that via the data lines, data can be exchanged between the computation unit and the adjustment means and/or capturing means. The computation unit may comprise a data processor, in particular a data processing system.

Preferably the computation unit is set up to evaluate the captured process states using a specified objective, to specify the process parameters and to set up the apparatus through specification of learned set-up parameters.

An apparatus according to the invention with features as previously described may be produced easily and cost-effectively. In addition, it is particularly suitable for carrying out the previously described method. An apparatus according to the invention hence shares, among other things, the advantages which are achievable with the inventive method and its variations. The same applies to the apparatus described next.

In order to solve the named task, additionally an apparatus is proposed for biological processes in which means are provided and set up for carrying out a method which is designed in accordance with the invention, in particular as described above and/or in accordance with one of the claims geared towards a method. Preferably the apparatus is designed as described above, wherein the apparatus may have any desired combination of the technical features previously named.

BRIEF DESCRIPTION OF THE DRAWINGS

The invention shall now be described in more detail using a few exemplary embodiments, but it is not limited to these few exemplary embodiments. Additional exemplary embodiments arise from the combination of the features from single or multiple claims with each other and/or with single or multiple features of the exemplary embodiments.

The following are shown by the figures.

DETAILED DESCRIPTION

In the following description of the invention, elements that have the same function are given corresponding reference numbers even if their design or shape differs.

Figure 1:
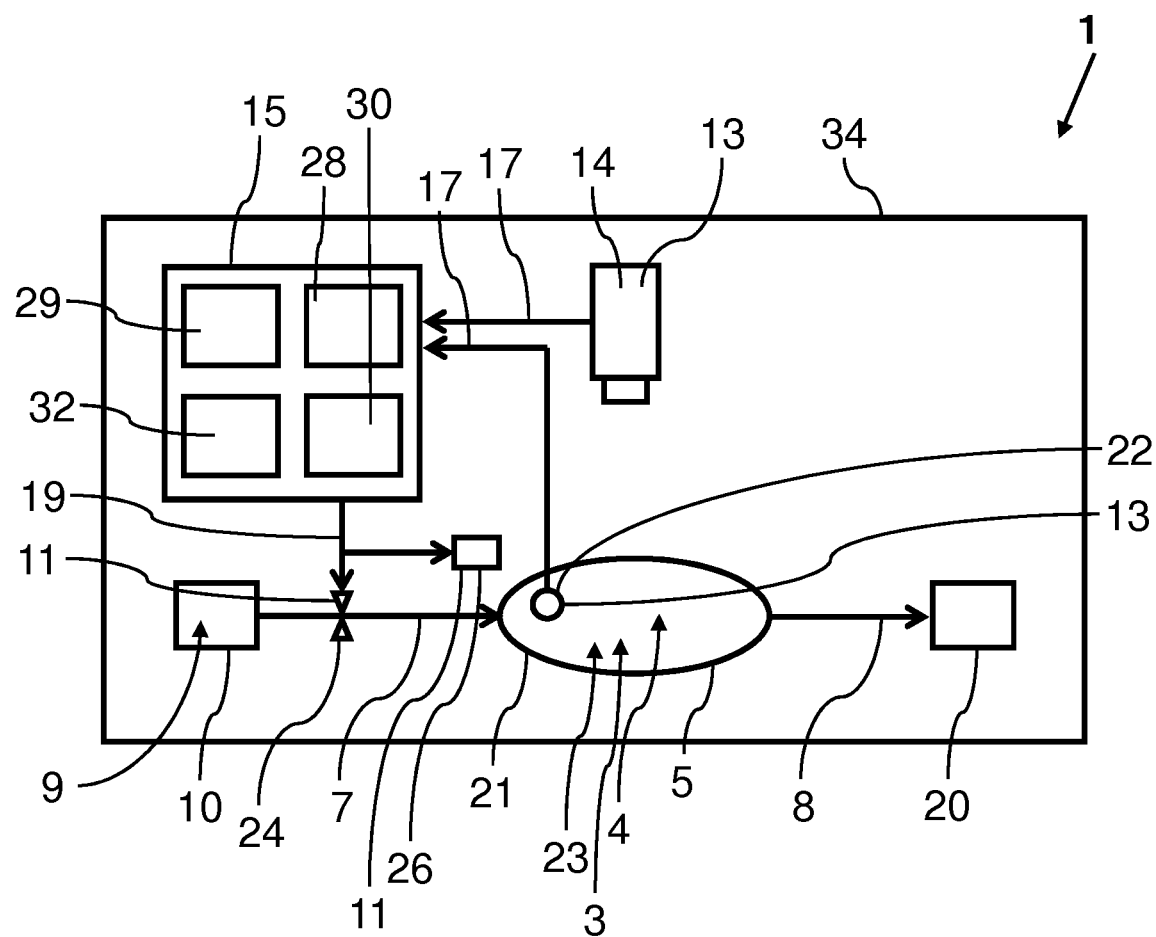
FIG. 1 an exemplary embodiment of an inventive apparatus for biological processes, and FIG. 2 a flow diagram of an exemplary embodiment of an inventive method for setting up the apparatus shown in FIG. 1.

FIG. 1 shows an exemplary embodiment of an inventive apparatus 1 for biological processes 3. The apparatus 1 has a housing 34 in which the remaining components of the apparatus 1 are arranged. The apparatus 1 has a size and weight of such proportions that a user of the apparatus 1 of average constitution may carry and transport the apparatus 1 himself. It may therefore also be said that the apparatus 1 is transportable. With an alternative exemplary embodiment, the apparatus 1 may have any desired size or weight or be designed such that not all components are arranged in a housing 34.

In apparatus 1 a vessel 5 is arranged. In the exemplary embodiment described here, the vessel 5 is a microfluidic device 21 which has several supply lines 7 and a discharge line 8. In the microfluidic device 21, several ducts are constructed that are not connected to each other on the input side, wherein each duct has several chambers arranged one behind the other. On the output side, the ducts are merged into the common discharge line 8. Each duct is connected on the input side to two supply lines 7. One of the two supply lines 7 is connected to a reservoir 10, in which a substance 9 can be accommodated. The other supply line 7 is connected to an additional reservoir 10, in which a further substance 9 can be accommodated.

In the exemplary embodiment described here, the reservoir 10 is, in order to carry out an inventive method, filled with a nutrient solution for a cell culture 23. In the additional reservoir 10, there is a growth factor for the cell culture 23. In each of the chambers of the microfluidic device 21 there is a partial biological sample. The partial biological samples together form a biological sample 4, which in the exemplary embodiment described here is provided by the cell culture 23. The apparatus 1 is therefore already prepared sufficiently so that biological processes 3 can run in it. The apparatus 1 may also be prepared in any other desired manner.

The microfluidic device 21 can be replaced by a microfluidic device 21 of an alternative design or by another vessel 5. Also, the connections and number of supply lines 7 and reservoirs 10 are adaptable. However, it may also be provided that an alternative apparatus 1 does not permit any flexibility of this kind.

The discharge line 8 is connected to a container 20 in which material exiting the vessel 5 can be collected.

A valve 24 is arranged on each of the supply lines 7. The valves 24 can each be controlled via a further data line 19. At the same time, the valves 24 are adjustable in such a way that a volume flow of a substance 9 flowing in one of the supply lines 7 is adjustable. In addition, a heating element 26 is constructed which is likewise controllable via the additional data line 19. By means of the heating element 26, a temperature can be set which prevails in the vessel 5. In an alternative exemplary embodiment, it may also be provided that for each duct of the microfluidic device 21 a separate heating element 26 is provided, meaning that the temperature in the chambers of the respective duct can be individually set for each duct.

In addition, a capturing means 13 designed as a sensor 22 is provided, wherein in the exemplary embodiment described here the sensor 22 is a temperature sensor. With the temperature sensor, a temperature within the vessel 5 can be measured. An output signal of the temperature sensor may be transmitted via the data line 17 to a computation unit 15. Furthermore, an imaging camera 14 is provided as a capturing means 13. The imaging camera 14 is aligned towards the vessel 5. Using imaging camera 14 it is therefore possible to record image information, wherein the image camera 14 is set up in such a way that a process state of interest of the biological processes 3 can be determined in sufficient resolution with sufficient accuracy. The imaging camera 14 is connected via a data line 17 to the computation unit 15. The recorded image information may thus be transferred to the computation unit 15.

The computation unit 15 is hence connected via the data lines 17 to the capturing means 13 and via the further data line 19 to the adjustment means 11, here valves 24 and the heating element 26. Information about process states may hence be supplied to the computation unit 15. In addition, it is possible for process parameters to be specified with the computation unit 15 which may be adjusted via the further data line 19 and the adjustment means 11. The computation unit 15 comprises peripheral equipment 28, for example an input means such as a keyboard, in order to issue control commands to the apparatus 1 manually, or output means in order to be able to output information from apparatus 1, from the biological processes 3 or from a method carried out with the apparatus 1. In addition, the computation unit 15 has interfaces 29 for the purposes of connecting the computation unit 15 via the data lines 17 and 19 to the capturing means 13 and the adjustment means 11, or in order to attach the computation unit 15 to an external data source via which instruction commands may also be inputted. The computation unit 15 has a processor with which computer programs can be executed. Furthermore, the computation unit 15 has temporary and permanent memories 30. In the memories 30 computer programs may be stored with which, in particular, substeps of the method described further down for setting up an apparatus 1 may be carried out. Furthermore, the data received via the data lines 17 or data processed further from this may be stored in the memories 30.

The computation unit 15 also comprises means for generating a random number. To this end a separate component may for example be provided and/or a computer program stored in one of the memories 30.

Figure 2:
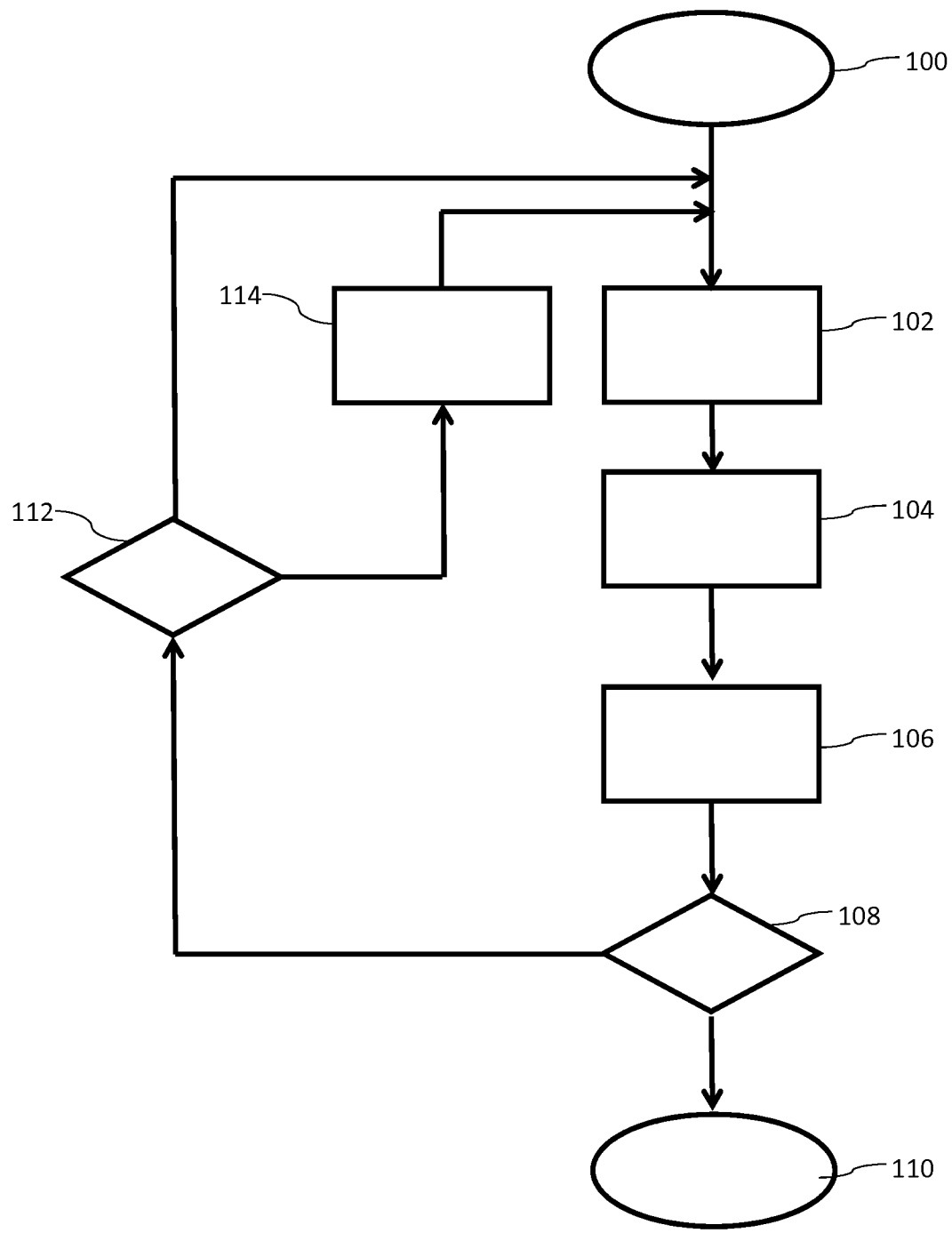

FIG. 2 shows an exemplary embodiment of an inventive method with which, in the exemplary embodiment described here, the apparatus 1 is set up.

In a first step 100 the method is initialized. To this end, the apparatus 1 is initially set up—as already described above—so that the biological processes 3 can run. The reservoirs 10 are hence filled with the required substances 9 and the vessel 5 with the biological sample 4. Furthermore, initial values are specified for the process parameters. For example, for initialization over the entire time horizon, a constant temperature can be specified, a particular volume flow can be set for the nutrient solution and the volume flow for the growth factor may for example be set to zero. Hence it can also be said that the biological processes 3 are placed in an initial state.

Alternatively, the initialization may also comprise the result from a preliminary analysis being stored in the memory 30 of the apparatus 1. Alternatively, a simulation routine may be started in order to obtain an initialization.

In step 100, additionally an objective is defined, by means of which the respective process states are to be evaluated. Examples of an objective have already been presented above. In order to maximize cell growth, the objective may for example state that the number of cells should be optimized after a certain time horizon has elapsed. In order to enable an evaluation, it is therefore specified that the image information received by the imaging camera 14 is filtered so that the number of living cells is determined. A suitable algorithm which can filter this information must therefore be selected.

In step 102, a process state is then automatically captured for each biological process 3. To this end, data is recorded with the imaging camera 14 and filtered as for example previously described; data is recorded with the remaining recording means 13 and as applicable further data estimated from the previous captured process states and specified process parameters. For example, a time integral may be estimated via an adjusted process parameter.

In the subsequent step 104, the captured process states are evaluated using the previously defined objective, wherein to this end particularly a suitable evaluation criterion, which may be a reward function, may be specified.

In step 106, the process parameters to be specified are then updated from the evaluations by means of a learning method specified in step 100. The learning method may be one of the methods already described above, in particular for example those of machine learning. In order to calculate the updated process parameters, particular consideration is given to that which the learning method has already learned in terms of relevant material in the past.

In a subsequent step 108, it is then decided whether the apparatus 1 is adequately set up or whether the method should be continued. Consequently, a termination criterion already determined in step 100 is analyzed. The termination criterion may envisage the elapsing of a particular timeframe, a value falling below a threshold value which indicates that the apparatus 1 is already set up sufficiently well that only small improvements are expected or any other desired termination criterion.

With an application in which the biological processes are always in largely the same initial state, and with which an evaluation is always only performed after a defined or complete process timeframe has elapsed, it may be provided that the learned set-up parameters correspond to the most recently learned process parameters. In particular when the method also takes into consideration different initial states of the biological processes and/or if evaluations also take place while a biological process is running, for example in real time, then it may be particularly advantageous if the learned set-up parameters comprise assignments between process states and process parameters. This applies beyond the scope of the exemplary embodiment described here.

If the termination criterion in step 108 is fulfilled, then the method is ended in step 110. To this end, the learned set-up parameters are saved for later specification.

If the termination criterion in step 108 is not fulfilled, then it is decided in step 112 whether the vessel 5 should be prepared with a new biological sample 4 or whether the method should be continued unimpeded. Newly preparing the vessel 5 may for example be necessary if a particular time horizon has been reached or if an event has occurred in the case of which a direct continuation of the method would not result in an efficient improvement of the set-up of the apparatus 1. If for example cancer cells are to be eliminated and if this has been fully achieved without the population being able to recover, then renewed preparation is suitable and necessary. This may also be necessary if unwanted signal paths from cells of the cell culture 23 have been activated.

If therefore renewed preparation is to take place, this is carried out in step 114. The method is then continued in step 102.

If renewed preparation is not required, then the method is continued immediately after step 112 in step 102.

Hence in summary it is proposed that, with a method for setting up an apparatus 1 for biological processes 3, it be provided that for a plurality of biological processes 3 process parameters are specified with computer assistance in each case, that for each biological process 3 a process state is automatically captured, that the particular process state is evaluated using a specified objective with computer assistance, and that from the evaluations the apparatus 1 is set up, with computer assistance, through specification of learned set-up parameters. In addition, an apparatus 1 for biological processes 3 is proposed which has means with which the proposed method can be carried out in a particularly advantageous manner.

LIST OF REFERENCE SYMBOLS

1 Apparatus
3 Biological process
4 Biological sample
5 Vessel
7 Supply line
8 Discharge line
9 Substance
10 Reservoir for 9
11 Adjustment means
13 Capturing means
14 Imaging camera
15 Computation unit
17 Data line
19 Further data line
20 Container
21 Microfluidic device
22 Sensor
23 Cell culture
24 Valve
26 Heating element 28 Peripheral equipment
29 Interface
30 Memory
32 Processor
34 Housing
100 Initialization
102 Capturing of process states
104 Evaluation of process states
106 Updating of process parameters
108 Decision to continue the method
110 Termination of method
112 Decision about renewed preparation of vessel 5
114 Renewed preparation of vessel 5

The invention claimed is:

1. A method for setting up an apparatus for biological processes, the apparatus comprising:
  a vessel for accommodating a biological sample, with which a plurality of biological processes can be carried out;
  adjustment means for adjusting process parameters for the biological processes;
  capturing means comprising at least one of an imaging camera or a sensor, with which a process state is automatically capturable for each of the plurality of biological processes; and
  a processor which is connected via a first data line to the capturing means and which is connected via a second data line to the adjustment means, and
the method comprising:
  specifying, by the processor, the process parameters for the plurality of biological processes,
  automatically capturing, by the capturing means, a process state for each of the plurality of biological processes;
  evaluating, by the processor and based on a specified objective forming or derived from an evaluation criterion comprising at least one of a reward function, a cost function, or a penalty function, each automatically captured process state to generate an evaluated process state;
  generating, by the processor and using a machine learning method which learns from evaluations of captured process states, learned set-up parameters based on the evaluated process states, wherein the learned set-up parameters comprise
    (i) learned process parameters, or
    (ii) assignments between captured process states and learned process parameters; and
  setting up, by the processor and using the adjustment means, the apparatus based on the generated learned set-up parameters.

2. The method in accordance with claim 1, further comprising generating, by the processor and using a random number generator, a random number, wherein the specifying of the process parameters comprises specifying, by the processor, the process parameters for the plurality of biological processes based at least in part on the generated random number.

3. The method in accordance with claim 2, wherein a most probable value for the process parameters is calculated in a purely deterministic manner from the process states already captured and the evaluations of said process states.

4. The method in accordance with claim 1, further comprising, for initialization of the method, using results of preliminary analyses that comprise at least one of an experiment or a computer simulation of the biological process.

5. The method in accordance with claim 1 wherein certain ones of the biological processes from the plurality of biological processes run in parallel, and for at least two biological processes running in parallel, different process parameters are specified.

6. The method in accordance with claim 1, wherein one said process state or at least one parameter of one said process state of one said biological process is reset.

7. The method in accordance with claim 1, further comprising reducing, by the processor, a parameter range of the process parameters by specifying temporal progressions of the process parameters and mixing the temporal progressions with each other.

8. The method for controlling the apparatus in accordance with claim 1, wherein the apparatus receives a plurality of biological samples and is controlled by one said process parameter being adjusted, wherein an experiment is performed which comprises a repeated application of a partial experiment, wherein the partial experiment comprises at least the following steps:
  adjusting a current one of said process parameters according to an update previously performed with computer assistance,
  automatically capturing a current state parameter for each biological sample and at least one of processing or storing the captured current state parameters,
  generating an evaluation result through computer-assisted evaluation of a result of the partial experiment using an objective and a current experimental parameter, wherein the current experimental parameter comprises at least one of a current state parameter or a current process parameter, as well as at least one of processing or storing the evaluation result,
  updating of the process parameter through computer-assisted derivation from at least one of previously processed or stored ones of the experimental parameters and evaluation results and at least one of processing or storing the updated process parameter.

9. The method of claim 3, further comprising modelling, by the processor and based on the random number, an uncertainty of a first estimation for a specification of the process parameters to arrive at a better estimation.

10. The method in accordance with claim 1, wherein certain ones of the biological processes from the plurality of biological processes run in series.

11. The method in accordance with claim 1, wherein during the course of one said biological process, the process state of said one biological process is at least one of captured or evaluated, or the process parameters are specified several times.

12. The method in accordance with claim 7, wherein the temporal progressions of the process parameters comprise a sinusoidal temporal progression of a process parameter.

* * * * *